LOG BREAKING DEVICE

This invention relates to a manually operated log breaking device for use in tree falling, and particularly to be used for the directed felling of rooted trees.

It is an object of this invention to provide a log breaking device which is lightweight, stable and structurally simple which can be effectively used with a minimum of wasted tree wood.

According to this invention there is provided a manually operated mechanical log breaking device comprising an elongated manually operable lever having in the region of one end a first pressure plate, a second pressure plate hinged to the first pressure plate and a pressure element or elements connected in spaced relation to the first and second pressure plates by two links pivotally interconnected with the pressure element or elements at one of their respective ends, the other of the respective ends of the links being pivotally connected respectively to the first and second pressure plates.

The first pressure plate preferably extends along the axis of the lever, which may have a handle at its other end.

The links and the pressure element are preferably mutually pivotally interconnected by engaging a common bolt or axle and a plurality of parallel links may extend between the axle and the foot and the pressure plate.

One preferred pressure element is a third pressure plate pivotable about the common axle, being substantially rectangular in shape and protruding only very slightly if at all above the surface of the first and second pressure plates when the device is in the horizontal, insertion ready position.

Preferred pressure elements include a plurality of cylindrical rollers, freely rotational about their central longitudinal axis on the common axle. Again, these rollers may only protrude slightly above the surface of the first and second pressure plates when same are level.

The rollers may be provided with teeth or other rough surface to help increase frictional grip with the tree fibre.

Preferably the pressure plates have projections from their outwardly presented surfaces for similar purposes.

The active surface area of the roller incorporated device may be increased by using same in conjunction with a separate pressure plate which is pushed into engagement with the work by the rollers upon actuation of the device. In order that such plate will not fall off the rollers the plate may be provided with a track or channel in that surface which engages the rollers in operation. Furthermore the lateral width of such channel corresponds approximately to the lateral distance occupied by the rollers and the links on their common axle.

Such modification of the plate eases the insertion operation of same, avoiding the necessity to hold same and simultaneously operate the device.

Alternatively or additionally such extra pressure plate may be magnetized for greater adhesion to the rollers, eliminating the need to hold said plate in position.

A platform may be incorporated in the first pressure plate which serves to support or catch the underside of the pressure elements from sudden impact encountered in wind felling.

The link or links pivotally connected to the first and second pressure plates from the common axle may be identical.

With a third pressure plate acting as the pressure element, the device is particularly useful in felling soft wooded or rotten trees. The surface area of such third plate is designed to support soft wood trees without damaging same under influence of the forces acting through the device.

Both embodiments of the device will operate within a smaller sawcut than the model disclosed in U.S. Pat. No. 4,030,700 with consequent reduction in wasted wood. The third pressure plate has a rounded chamfered leading edge 4a. This is affected by reducing the thickness of the tool to be inserted in the sawcut.

The embodiment employing rollers is especially useful in felling hardwood trees, the device taking advantage of the wedge shape cut in the tree and being insertable further towards the felling hinge when the tree sways in the wind.

Springs and guiding members are eliminated from the structure which are prone to distortion or breakage. The tool structure is lightweight with few moving parts which considerably reduces manufacturing costs.

The device according to this invention may be used effectively in a wedge cut above the main horizontal sawcut, the device not needing manual support until the felling is effected by levering on the handle.

Two embodiments of the invention will now be described by way of example with reference to the accompanying drawings in which:

FIG. 1 is a side elevation of the plate version extended.

FIG. 2 is a plan view of the plate version unextended.

FIG. 3 is a side elevation of FIG. 2.

FIG. 4 is a side elevation of the roller version unextended.

FIG. 5 is a side elevation of the roller and plate combination unextended;

FIG. 6 is a perspective view of the multi roller version unextended; and

FIG. 7 is a side elevational view of a modification of the roller and plate combination of FIG. 5.

Referring firstly to FIGS. 1 to 3, a lever 1 is connected to a first pressure plate or foot 2 which is hinged upon an axle 13 to a second pressure plate 3. A first link 5 is pivotally hinged to the foot 2 by an axle 9 and pivotally hinged to a third pressure plate 4 by an axle 7. This same axle 7 also pivotally engages a second link 6 to the third plate 4, the other end of the link 6 being pivotally hinged to the second pressure plate 3 by an axle 8. A platform 15 is provided between axle 9 and axle 13 which serves to absorb impact on rebound to the pressure plate 4, relieving these said axles of stress in a tree swaying situation.

The second pressure plate 3 has projections 10 for engaging with tree fibre when the device is inserted into a sawcut. Insertion in a narrow cut is effected with the configuration of FIG. 3.

Raising the lever 1 causes the foot 2 to pivot in relation to the second pressure plate 3 which remains gripping the tree fibre. The hinged links 5, 6 cause the third pressure plate 4 to be displaced away from the second plate 3 until it engages the tree fibre on the complementary side of the sawcut. Further levering on the handle 1 pushes the tree away from the cut and is consequently felled.

United States Patent [19]

Heikkinen et al.

[11] 4,243,206
[45] Jan. 6, 1981

[54] APPARATUS FOR REMOVING WEEDS

[76] Inventors: Verner E. Heikkinen, 2021 Holt Rd., Arlington, Tex. 76011; Edward A. Heikkinen, 1217 Columbine Ct., Arlington, Tex. 76013

[21] Appl. No.: 38,344

[22] Filed: May 11, 1979

[51] Int. Cl.³ ............................................. B66F 3/00
[52] U.S. Cl. ...................................... 254/132; 294/50
[58] Field of Search ........................... 254/131.5, 132; 56/400.08, 400.1, 400.21; 294/50

[56] References Cited
U.S. PATENT DOCUMENTS 1,654,780  1/1928  Borsted ................................ 254/132

Primary Examiner—Robert C. Watson
Attorney, Agent, or Firm—Wofford, Fails & Zobal

[57] ABSTRACT

An apparatus for removing weeds or other plants comprising a handle having a foot operated lever pivotally coupled to one end. A plurality of tines are connected to the front end of the lever for insertion into the ground for removing weeds or other plants as the front end of the lever is pivoted upward. The tines extend through apertures formed through a clean off plate which is adapted to slide on the tines between a rearward position near the front end of the lever and a forward position near the front ends of the tines. As the handle is pivoted forward, the clean off plate is moved forward by the end of the handle to clean weeds, dirt, etc. from the tines.

9 Claims, 5 Drawing Figures

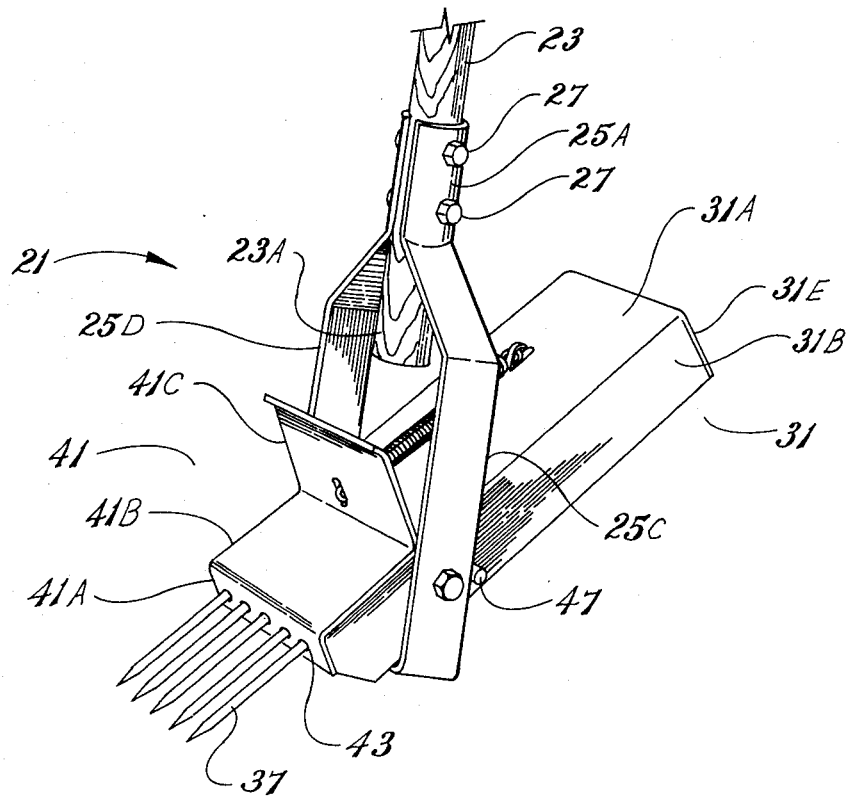

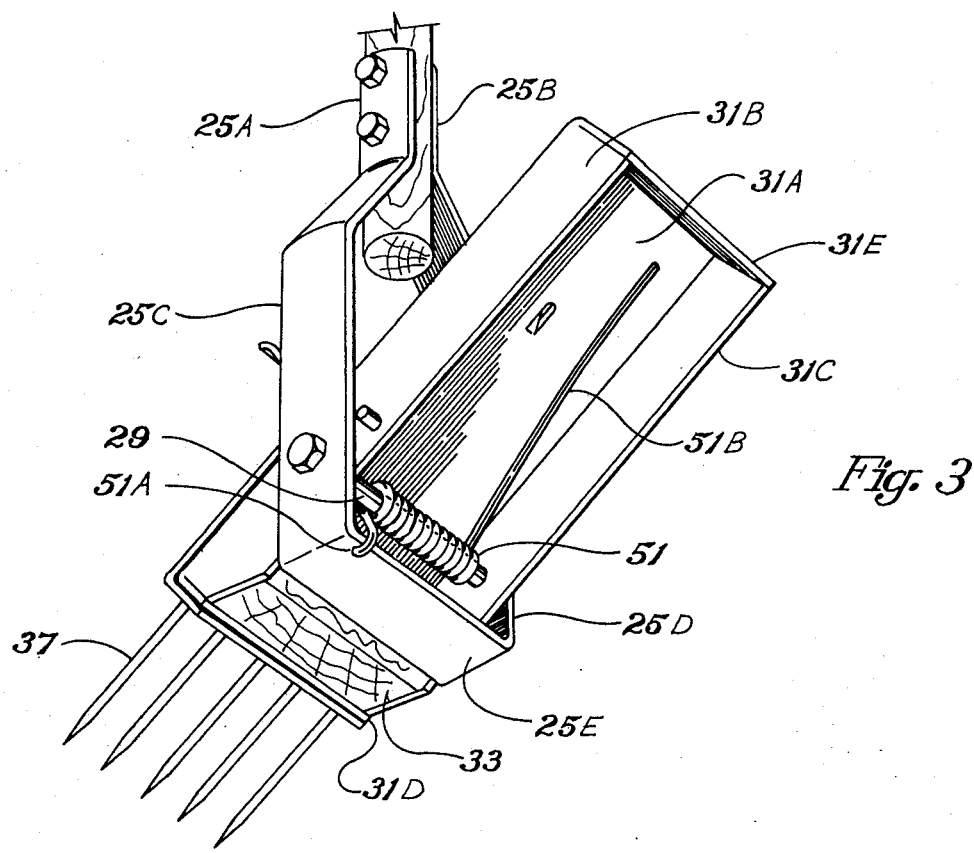
Fig. 3
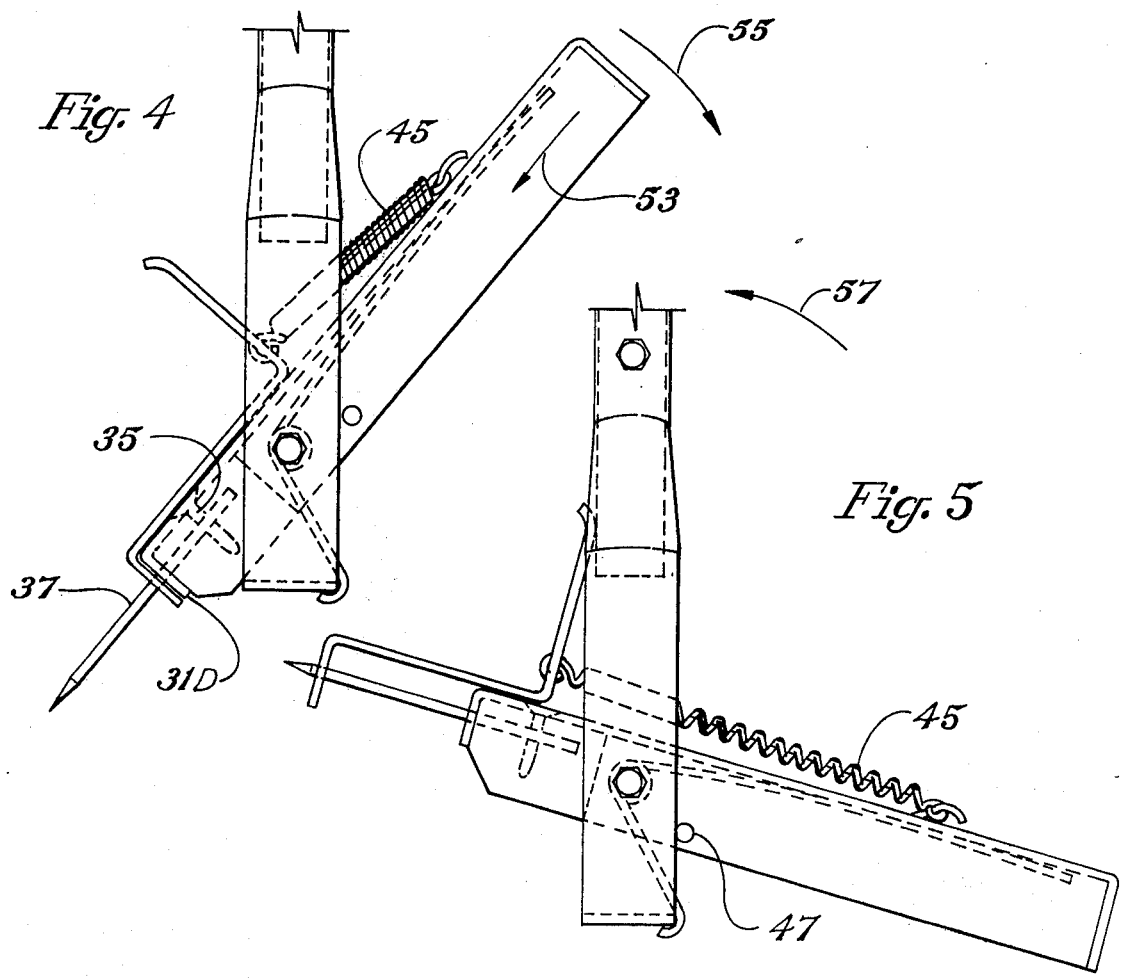
Fig. 4
Fig. 5

4,243,206

APPARATUS FOR REMOVING WEEDS

BACKGROUND OF THE INVENTION

This invention relates to a lawn tool for removing plants such as weeds or grass from the ground.

SUMMARY OF THE INVENTION

It is an object of the present invention to provide a simple and effective apparatus for removing plants from the ground.

It is another object of the present invention to provide a plant removing apparatus comprising a foot operated lever pivotally coupled to a handle and which has a plurality of tines attached to its front end for insertion into the ground for removing plants.

It is a further object of the present invention to provide such an apparatus having a clean off plate slidable on the tines and which is moved forward by a portion of the handle as the handle is pivoted forward to remove plants, dirt, etc. from the tines.

BRIEF DESCRIPTION OF THE DRAWINGS

FIG. 3 illustrates the under side of the lever of the apparatus of FIG. 1.

FIG. 4 is a side view of the apparatus of FIG. 1 with its lever in a start or ready position such that its tines may be inserted into the ground.

FIG. 5 is a side view of the apparatus of FIG. 1 with its handle pivoted to a position to move the clean off plate forward.

DESCRIPTION OF THE PREFERRED EMBODIMENT

Figure 1:
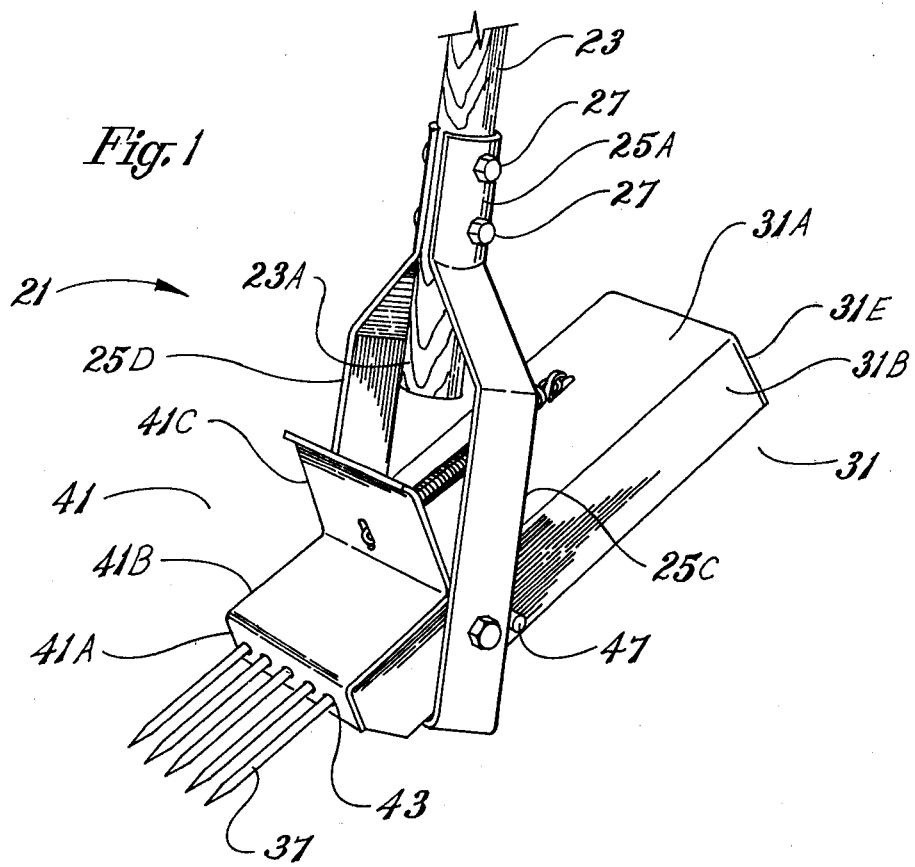
FIG. 1 is a perspective view of the apparatus of the present invention illustrating its lever in a start or ready position such that its tines may be inserted into the ground.

Referring now to the drawings, the apparatus of the present invention is identified at 21. It comprises a handle 23 having the ends 25A and 25B of a shaped metal member 25 connected thereto at a point above its lower end 23A. Connection of by way of bolts 27. The ends 25A and 25B flange outward defining two spaced apart support arms 25C and 25D which extend below the lower end 23A of the handle 23. Arms 25C and 25D are joined at their lower ends by a transverse support portion 25E.

Located between the arms 25C and 25D and pivotally coupled thereto by way of a bolt 29 is a lever 31. The lever 31 is an inverted pan shaped member comprising a top plate 31A having two sides 31B and 31C, a front end 31D and a rear end 31E extending therefrom. A wooden block 33 is located and attached in the front portion of the lever between sides 31B and 31C and next to the front end 31D. Attachment is by way of screws 35 which extend through the top plate 31A. A plurality of tines 37 are held in apertures formed in the block 33 and extend outward through apertures formed through the front end 31D of the lever. In the embodiment disclosed, five spaced apart tines 37 are provided.

A clean off member 41 is provided for cleaning the tines 37. It comprises a front plate 41A having a plurality of apertures 43 through which the tines 37 extend; a rearward extending portion 41B transverse to plate 41A; and a rear member 41C transverse to portion 41B.

Figure 2:
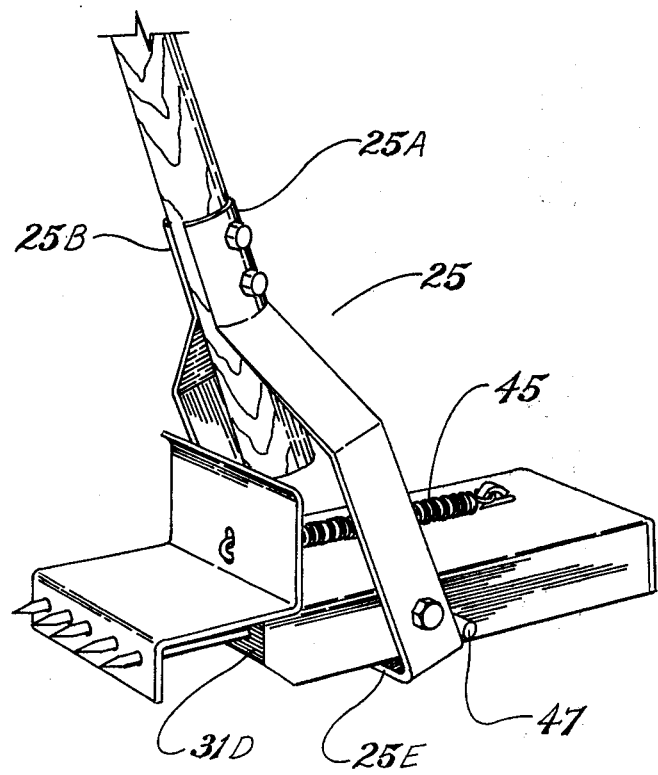
FIG. 2 illustrates the apparatus of FIG. 1 with its handle pivoted forward.

The apertures 43 are large enough such that the member 41 may slide from a rearward position next to the front end 31D of lever 31 as shown in FIGS. 1, 3, and 4 to a forward position near the front ends of the tines 37 as shown in FIGS. 2 and 5. Clean off member 41 is urged to its rearward position by a spring 45 connected to member 41C and top plate 31A of the lever. Member 41C extends upward sufficient such that its rear side will be engaged by the lower portion 23A of the handle 23 to move the clean off plate 41A to its forward position when the handle 23 is pivoted forward as shown in FIGS. 2 and 5. When the handle 23 and the lever 31 are in the position shown in FIGS. 1, 3, and 4 end 23A of handle 23 is located out of engagement of member 41C whereby the spring 45 will pull the clean off member 41 to its rearward position wherein the rear surface of plate 41A abuts against the front end 31D of lever 31. The tines 37 act as guides for the member 41 as it is slid between its forward and rearward positions. A stop 47 extends from side 31B of lever 31 for engaging the rear end of arm 25C when the handle 23 and lever 31 are in the position shown in FIGS. 2 and 5 and prevents the handle 23 from being rotated further counterclockwise from that shown in FIGS. 2 and 5. Thus the stop 47 limits the forward position to which the clean off member 41 can be moved by the end 23A of the handle thereby preventing it from being moved off of the tines.

As shown in FIGS. 3–5, a torsion spring 51 is located around bolt 29 and has one end 51A which engages lower support member 25E and an opposite 51B which engages the under side of the top plate 31A of lever 31 and urges the lever to the start or ready position as shown in FIGS. 1 and 4.

In use, the lever 31 is allowed to assume the start position as shown in FIGS. 1 and 4 whereby the tines 37 extend down below the lower support portion 25E of the handle 23. The user then places his foot on the rear end 31E of the lever 31 and applies downward linear pressure in the direction of arrow 53 to insert the tines 37 into the ground until the lower support member 25E engages the ground. While holding the handle 23 upright, the user then applies a downward rotational force to the rear end 31E of the lever 31 with his foot, as shown by arrow 55, to move the rear end 31E of the lever 31 down and its front end up as shown in FIG. 5. This action removes the plants caught between the tines from the ground. The user next rotates the handle in the direction as shown by arrow 57 in FIG. 5 to move the clean off plate 41A forward to clean the plants, dirt, etc. from the tines.

In the preferred embodiment, the tines extend outward beyond the front end 31D about 2¼ inches and are spaced from each other at a distance not less than ¼ of an inch nor greater than 1 inch whereby the device may be employed to remove small plants that grow in the yard. Preferably the tines are formed of stainless steel. Although a wooden block 33 is employed for holding the tines, it is to be understood that the block can be formed of other types of material. The handle 23 preferably is about 42 inches long.

Although the end 23A of the handle 23 is employed for moving the clean off member forward, it is to be understood that suitable structure may be coupled to arms 25C and 25D for performing the same function.

What is claimed is:

1. An apparatus for removing plants from the ground, comprising: